US012609777B2

(12) United States Patent
Podolski et al.

(10) Patent No.: US 12,609,777 B2
(45) Date of Patent: Apr. 21, 2026

(54) METHOD AND APPARATUS FOR LOCALIZING A SIGNAL SOURCE

(71) Applicant: Airbus Defence and Space GmbH, Taufkirchen (DE)

(72) Inventors: Roman Podolski, Taufkirchen (DE); Fotios Katsilieris, Taufkirchen (DE); Antonio Perez Acal, Taufkirchen (DE); Markus Siede, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 615 days.

(21) Appl. No.: 17/952,403

(22) Filed: Sep. 26, 2022

(65) Prior Publication Data

US 2023/0099233 A1     Mar. 30, 2023

(30) Foreign Application Priority Data

Sep. 27, 2021     (DE) ..................... 10 2021 124 858.2

(51) Int. Cl.
H04B 17/27          (2015.01)
(52) U.S. Cl.
CPC .................................. H04B 17/27 (2015.01)
(58) Field of Classification Search
CPC ..... H04B 17/27; H04B 17/318; G01S 5/0278; G01S 3/043
See application file for complete search history.

(56) References Cited

U.S. PATENT DOCUMENTS

| | | | | |
|---|---|---|---|---|
| 4,275,399 | A * | 6/1981 | Marom ..................... | G01S 3/28 |
| | | | | 342/147 |
| 5,045,860 | A * | 9/1991 | Hodson ................. | G01S 5/0009 |
| | | | | 342/465 |
| 11,212,018 | B2 * | 12/2021 | Khalajmehrabadi ...................... | |
| | | | | H04B 17/391 |

(Continued)

FOREIGN PATENT DOCUMENTS

| | | | | | |
|---|---|---|---|---|---|
| DE | 102014219148 | * | 3/2016 | ............. | G08B 21/02 |
| DE | 10 2016 217 532 A1 | | 7/2017 | | |
| EP | 566391 A1 | * | 10/1993 | ............... | G01S 5/14 |

OTHER PUBLICATIONS

Fowler, Mark, "Analysis of single-platform passive emitter location with terrain data," IEEE Transactions on Aerospace and Electronic Systems, vol. 37. No. 2, Apr. 2001, pp. 495-507.

(Continued)

*Primary Examiner* — Kathy W Wang-Hurst
(74) *Attorney, Agent, or Firm* — KDW Firm PLLC

(57)          ABSTRACT

A method for localizing a signal source which emits a signal, including determining a location-dependent bearing measurement of the signal source, receiving a type identification of the signal source, ascertaining a location-dependent residence probability ($l_{threat}(\hat{p})$, $l_{shoot}(\hat{p})$, $l_{alt}(\hat{p})$) of the signal source depending on the received type identification of the signal source, superposing the location-dependent bearing measurement of the signal source with the location-dependent residence probability ($l_{threat}(\hat{p})$, $l_{shoot}(\hat{p})$, $l_{alt}(\hat{p})$).

10 Claims, 3 Drawing Sheets

(56) References Cited

U.S. PATENT DOCUMENTS

| | | | |
|---|---|---|---|
| 2004/0164902 A1* | 8/2004 | Karlsson | G01S 3/046 |
| | | | 342/464 |
| 2010/0138184 A1* | 6/2010 | Fernandez | G01S 5/14 |
| | | | 702/150 |
| 2017/0120803 A1 | 5/2017 | Kentley et al. | |
| 2017/0205492 A1* | 7/2017 | Jacklin | G01S 5/06 |

OTHER PUBLICATIONS

German Office Action for Application No. 102021124858 dated May 24, 2022.

European Office Action for U.S. Appl. No. 22/195,353 dated Feb. 13, 2023.

* cited by examiner

METHOD AND APPARATUS FOR LOCALIZING A SIGNAL SOURCE

TECHNICAL FIELD

The present description relates to the field of localization. In particular, the present description relates to a method for localizing a signal source, a localization apparatus and a transport.

BACKGROUND

Progress leads to simplifications and improvements in the everyday life of human beings. Sensors that operate very precisely assist human beings in many areas of life and relieve them of unpleasant work.

Technology has also contributed to increasing safety. In the field of transport and traffic, in particular, technical devices perform many tasks in some instances better and more reliably than human beings are able to do with their sense organs.

In the field of navigation and localization, the global positioning system (GPS) has become widely adopted for determining one's own position. This involves receiving signals from which one's own position can be calculated. In this case, however, one is dependent on the provision of signals from external operators.

In the field of external locating, i.e. for finding obstacles, for example, use is made of radar, lidar and/or ultrasonic sensors. However, these again presuppose an active signal emission, for example an electromagnetic pulse and/or an acoustic pulse which is emitted and the reflection of which is measured.

What may also be of interest, however, is locating an external object without having to emit an active signal oneself since for example one would not like to be locatable oneself or, as in the field of observing the background radiation in space, a signal powerful enough to cover such long distances is not available.

In such situations, one is reliant on locating signal sources, so-called emitters. That involves locating an active signal of the signal source. However, only very inaccurate locating can be achieved by evaluating the signal.

The document "Analysis of single-platform passive emitter location with terrain data" by Mark L. Fowler in IEEE Transactions on Aerospace and Electronic Systems, Vol. 37(2001), No 2, April 2011, pages 495-507, shows that the computational performance for determining the position of an emitter can be influenced by providing altitude information.

The document US 2004/0164902 A1 relates to a direction finding method using probabilistic mapping.

The document US 2010/0138184 A1 relates to a likelihood map system for localizing an emitter.

SUMMARY

The problem addressed can be considered that of enabling effective localization.

This problem is solved by the subject matter and embodiments herein.

In accordance with one aspect, a method for localizing a signal source is provided, wherein the signal source emits a signal. A signal can be taken to mean an electromagnetic wave, thermal radiation, an optical signal and/or an acoustic wave. The method provides for determining a location-dependent bearing measurement of a signal source.

Furthermore, receiving a type identification of the signal source and ascertaining a location-dependent residence probability of the signal source depending on the received type identification of the signal source are carried out. In one example, the location-dependent residence probability is ascertained in accordance with the a-priori information available. Examples of such a-priori information may be signal-dependent radius indications, system-dictated restrictions which have a relation to the signal source, a threat residence probability function, a shooting residence probability function and/or altitude residence probability function.

The location-dependent bearing measurement of the signal source is superposed with the location-dependent residence probability and a position of the signal source ascertained from the superposing can then be provided.

This may mean that weakly pronounced bearing measurements can be amplified by a-priori information ascertained in another way being utilized in order to increase the accuracy of a position determination. All available information can be compressed in this way so that, firstly, the determination rate increases and, in particular, a required computing power decreases.

In one example, it may be possible to carry out an optical reconnaissance in an area with a high probability and to acquire a bearing therefrom. An image processing method which recognizes for example typical contours and/or structures of an emitter and/or of an associated device can be used for the optical reconnaissance. The evaluation can be carried out for example in a photograph and/or a radar image.

If the intention is to locate a passive and/or active signal of a signal source and/or of an emitter, it may happen that only very inaccurate locating and/or bearing acquisition can be achieved by evaluating the signal.

The inaccurate locating may be caused by the fact that the time required by the signal for example from the signal source to a localizing apparatus and in particular to a signal receiver cannot be accurately ascertained. Accurate locating may result from an accurate time detection.

The accuracy of the bearing acquisition may be able to be increased by an accurate time detection. However, the accuracy of the time detection may only be able to be increased within specific boundary conditions.

A high accuracy of the time detection in conjunction with taking account of a location-dependent residence probability may contribute to rapidly and accurately ascertaining the position of the signal source.

This is because the information ascertained may have to be evaluated over time in order to allow accurate locating. Time is a critical factor, however. Normally the position of the signal emitter is intended to be ascertained within a few seconds since an arriving radar signal can mean that the own position is now known.

In general, taking account of the a-priori residence probability of a signal source may contribute to a short time period until accurate locating can be effected.

In accordance with another aspect, ascertaining a location-dependent residence probability depending on the received type identification of the signal source comprises at least one a-priori ascertaining method selected from the group of a-priori ascertaining methods consisting of reading out metainformation, evaluating geoinformation, providing a type-identified geographical map, ascertaining points of interest, evaluating image data, evaluating movement data, applying image processing methods, applying data fusion, and evaluating propagation conditions of the signal.

In this regard, for example, by reading out metainformation, for example from a database and/or from a map, it is possible to ascertain elevations and/or raised areas, to process probability distributions, in particular geographical or location-dependent probability distributions, position distributions and/or geocoordinate distributions for predefinable objects, and/or to generate overlay maps. An overlay map may be superposed on another map in order to emphasize predefinable criteria. A pictorial representation of a location-dependent probability distribution for the appearance probability of a predefinable object or a pictorial location-dependent residence probability can for example combine and elucidate the superposition of all available information in a graphical visualization.

If consideration is given to data of a geographical map, for example, metadata can also be stored with respect to each geocoordinate. These metadata can for example define a specific element and/or a point of interest, such as a building and/or a road, more accurately than only with the geocoordinates. By way of example, the type of surface of a road can also be stored. If it is established for a geocoordinate for example that the type of surface comprises tarmac at this location, it is possible to infer from this that what is involved is a paved road on which a road-going vehicle may be situated, while it is rather unlikely that a road-going vehicle is situated at a geocoordinate identified as an area of water.

However, geoinformation such as the elevation of a landscape can also be evaluated, where the geoinformation can likewise be regarded as metainformation. In an exclusion procedure, the evaluation of the geoinformation may exclude geoinformation which is not appropriate for the recognized type of signal source.

The rules to be applied for such exclusion procedures can likewise be provided as a location-dependent residence probability.

The type of signal source can also comprise indications about the type of a system associated with the signal source. A system associated with the signal source may often be situated in the vicinity of the signal source. By way of example, a signal source may be associated with a surface-to-air missile (SAM) system, about which it may be known that this system can substantially only be used above a specific elevation above sea level. Therefore, a high efficiency may be achievable if the existence of signal sources in the vicinity of landmarks having military and/or strategic value known a priori is assumed and these are rated with a correspondingly high location-dependent residence probability.

In one example, such locations to which particular consideration is to be given can be ascertained as groups of locations and/or as a set of locations as a result of the type identification of the signal source. In another example, however, they can also be used for the orientation of a bearing measurement as early as before the type identification of the signal source. Examples of locations having particular strategic value may be elevations above sea level, the feedback from pilots from reconnaissance flights, airports, bridges and/or preselected landmarks. In other words, these locations to which particular consideration is to be given may be regions which are identified by coordinates and for which there is a high probability of being associated with a signal source sought, wherein this local information distinguished by the strategic value can arise from a database of previous missions and/or can be learned by a neural network.

In this regard, by way of example, it may be learned from the past that airports are locations having particular strategic value since signal sources have often been found there in the past. In other words, the appearance of SAMs in the vicinity of landmarks having military benefit, such as e.g. airfields, country borders, supply lines, etc., may be highly likely and/or probable.

Further information can be obtained from evaluating image data, such as, for example, satellite photographs, reconnaissance photographs, or corresponding videos. Evaluating image data and applying image processing methods may be used for example if geocoordinates with metadata are not available in respect of a terrain, for example because a road has only recently been constructed.

Moreover, movement data can give indications about where a signal source or an emitter is situated, particularly if this is mounted on a vehicle.

In the military field, tactical information can also be used to emphasize a specific interest weighting of regions, locations and/or landmarks in a geographical map. This interest weighting can be dependent on a specific objective formulated, for example, particularly if a very specifically defined signal source is intended to be found. Differently weighted maps can be provided for such different use scenarios.

In one example, the type of signal source and in particular the type of system associated with the signal source can be a tank, a ship or a stationary device. The type of signal source may be defined in particular by finding a specific radar, recognizing a specific signal characteristic, a pulse frequency, a pulse phase modulation, a frequency modulation, a signal strength, a pulse coding and/or a pulse repetition frequency.

The weighting may be able to be represented as a pictorial location-dependent residence probability and/or as a corresponding overlay map in which locations of particular interest are marked with particular weighting and/or in color. If the intention is to find a signal source in a mountain range, for example, then particularly weighted locations are emphasized, for example particularly shaped plateaus above a minimum altitude. In this case, the pictorial location-dependent residence probabilities indicate probabilities as to where a specific type of signal source is situated in a specific region, wherein the region can in turn be indicated by specific geographical indications such as altitude indications or other metainformation.

For the a-priori evaluation, it is possible to use for example the information regarding a sensor, a surface-to-air missile (SAM) system, a satellite photograph, an evaluation of a remote carrier (RC) and/or an evaluation of a high-altitude pseudo-satellite (HAPS).

An RC may be an unmanned and/or remote-controlled sensor. An RC may be a sensor which is situated at a distance from a control center and which supplies environment data present at its location to the control center and/or a central localization apparatus. The signals and/or findings from different remote sensors and/or RCs at different geographical locations can likewise influence the creation of a pictorial representation of a location-dependent residence probability and be compressed to form overall information. A remote sensor and/or RC may be part of a localization apparatus, such that a multiplicity of localization apparatuses can be combined to form an interconnected system of a localization apparatus. An RC may also be referred to as a platform on which a sensor is fitted.

Provision may be made, therefore, for compressing highly diverse types of information into a uniform format in order to make them comparable and then to combine them with bearing data obtained. In this way, the accuracy of a position determination carried out by bearing acquisition may be increased. Moreover, the time for the position determination may be short and be in the range of a few seconds.

It is thus possible to ascertain location-dependent regions on a map determined by location indications, at which regions RF emitters (Radio Frequency) are localized with a high accuracy. The a-priori data used for the evaluation can be ascertained nearly simultaneously with the position determination. In one example, the a-priori data can be ascertained substantially in parallel with the position determination. However, in another example, the a-priori data can also already have been ascertained before the time of the position determination.

In particular, such a-priori information can be represented as a pictorial location-dependent residence probability. This pictorial location-dependent residence probability representation can be continuously refined and adapted to new findings. A neural network can be trained for this purpose.

The ascertainment of the a-priori data and the bearing acquisition may be effected substantially independently of one another.

The pictorial location-dependent residence probability representation may be further supplemented and/or superposed with data that have been ascertained by cross-platform sensors.

In this regard, a rapid and accurate fusion of the sensor data, for example from sensors of unmanned aircraft, and/or the RC data, i.e. the data obtained by sensors on an RC, may be able to be achieved. Moreover, a rapid and accurate emitter localization can be achieved. A target-oriented recognition of an emitter position may be able to be derived from a pictorial location-dependent residence probability representation. In this case, the emitter can be regarded as the target.

The ghost characteristics, ghost tracks and/or ghost profiles that often arise during locating, from signal sources that are not unambiguously assignable and/or from signal sources that have not yet been localized with a sufficiently high probability, may be reduced and/or even entirely avoided.

In accordance with another aspect, receiving a type identification of the signal source comprises evaluating an emitter database and/or an image material, such as a photograph, for example.

During the type identification and/or categorization of an emitter, for example, the received signal can be evaluated and assigned to a specific emitter type. However, it can also be input manually, for example by an input apparatus. A manual input can be used if, as a stipulation of a mission, for example, it is necessary to find a specific type of emitter and/or an associated vehicle.

From the type of emitter, it is possible to draw conclusions about the location-dependent residence probabilities and a type-specific pictorial location-dependent residence probability representation can thus be generated. This representation may be created with the aid of the metainformation of a geographical map and, in one example, may be provided as an overlay map for the geographical map.

In accordance with another aspect, the location-dependent bearing measurement comprises applying a bearing method selected from the group of bearing methods consisting of a time of arrival (TOA) method, an angle of arrival (AOA) method, and a received signal strength (RSS) method. It is possible to use all methods from which a direction-dependent bearing and not just a location determination can be derived.

In this case, array antennas that enable a bearing to be acquired can be used, for example. Array antennas also allow corresponding angle measurements of the bearing signal by way of the setting of corresponding phase shifts between the individual arrays. These angle measurements can indicate a direction of the target.

However, the result of the individual measurements may often be very inaccurate, and for example substantially only produce a rough estimation of direction and/or whereabouts. Consequently, the evaluation of the a-priori data can be used as support for the measurements.

In accordance with yet another aspect, results of the location-dependent bearing measurement, results of the ascertainment of the location-dependent residence probability of the signal source and/or the ascertained position are/is transmitted and/or received.

Different bearing devices and/or different localization apparatuses can be coordinated by exchanging indications concerning the ascertained position.

It may be possible to receive signals of the emitter from different sensor positions and for example a triangulation may then be able to be created from the received data more rapidly in order to ascertain the position of the emitter. The same signal can be recorded by differently positioned sensors of remote carriers (RC) at different viewing angles.

In accordance with a further aspect, determining a location-dependent bearing measurement, receiving a type identification of the signal source and ascertaining a location-dependent residence probability of the signal source take place during a movement.

As an alternative and/or in addition to recording at different positions with different sensors which can be fixedly mounted on different carrier systems, the carrier system on which the sensor is mounted can also move and carry out recordings, bearing acquisitions, probability ascertainments, superpositions of data obtained and/or position ascertainments at different positions. RCs, balloons, satellites, but also masts, for example, with the respective sensors being fitted thereon, can be used as carrier system. From the temporally spaced results of the different sensors at the different locations, the information can then be refinable for the purpose of position determination. Moving and/or fixed sensors, in particular the data thereof, can be combined in any desired way.

In accordance with a further aspect, the method is carried out in a repetition loop using preceding results.

The repetition loop makes it possible for information already obtained to be able to influence the subsequent evaluation as feedback. The repetition can also enable a learning algorithm to be realized.

In accordance with another aspect, a program element is provided which, when it is executed by a processor, carries out the method for localizing a signal source.

In accordance with yet another aspect of the disclosure herein, a computer-readable storage medium is provided in which is stored a program which, when it is executed by a processor, carries out the method for localizing a signal source.

A floppy disk, for example 5¹/₄ or 3¹/₂, a CD (Compact Disc), a DVD (Digital Versatile Disk), a MiniDisk, a cassette, a hard disk, a USB (Universal Serial Bus) storage device, a RAM (Random Access Memory), a ROM (Read Only Memory) or an EPROM (Erasable Programmable Read Only Memory) may be used as a computer-readable storage medium. An ASIC (application-specific integrated circuit) or an FPGA (field-programmable gate array) and also an SSD (Solid-State Drive) technology or a flash-based storage medium may also be used as storage medium. A web server or a cloud may likewise be used as storage medium.

A communication network, such as the Internet, for example, which may permit the downloading of a program code, may also be regarded as a computer-readable storage medium. A radio-based network technology and/or a wired network technology can be used.

In accordance with another aspect, a localization apparatus for localizing a signal source is provided, comprising a bearing device, a type identifying device, an a-priori residence probability determining device and an evaluation device.

The bearing device is configured for determining a location-dependent bearing measurement of a signal source and the type identifying device is configured for receiving a type identification of the signal source.

The a-priori residence probability determining device is configured for ascertaining a location-dependent residence probability of the signal source depending on the received type identification of the signal source.

The evaluation device is configured for superposing the location-dependent bearing measurement of the signal source with the location-dependent residence probability and for providing a position of the signal source ascertained from the superposing.

In accordance with another aspect, a transport comprising a localization apparatus is described. The transport can be a land vehicle, an air vehicle, an aircraft and/or a watercraft.

BRIEF DESCRIPTION OF THE DRAWINGS

Example embodiments are discussed in greater detail below with reference to the accompanying drawings. The illustrations are schematic and not true to scale. Identical reference signs refer to identical or similar elements. In the figures.

DETAILED DESCRIPTION

Figure 1:
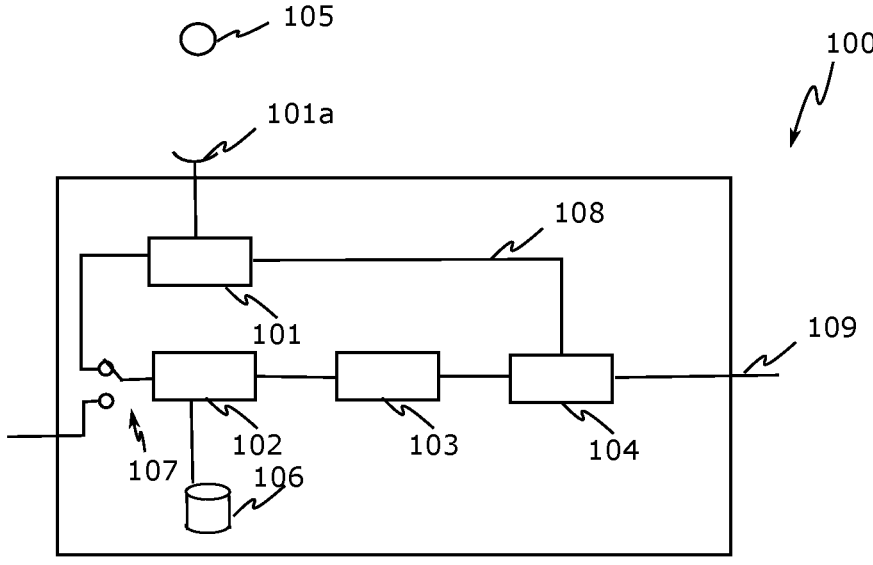
FIG. 1 shows a localization apparatus for localizing a signal source in accordance with one example embodiment.

FIG. 1 shows a localization apparatus 100 for localizing a signal source in accordance with one example embodiment.

The localization apparatus 100 comprises a bearing device 101, a type identifying device 102, an a-priori residence probability determining device 103 and an evaluation device 104.

The bearing device 101 is configured for determining a location-dependent bearing measurement of a signal source 105 and, in one example, comprises an antenna 101a. A substantially rough position determination of the signal source 105 can be effected thereby. By way of example, the antenna 101a may be an array antenna which can determine an angle at which it sees the signal source 105.

The type identifying device 102 is configured for receiving a type identification of the signal source. Switch 107 or selection device 107 can be used to set whether the intention is to implement an external type identification stipulation, which can involve inputting a reconnaissance data set and/or mission data, for example, and/or which can involve inputting what type of signal source 105 or emitter 105 is intended to be found.

In another switch position of the switch 107, the type identifying device 102 is directly connected to the bearing device 101 and the bearing device supplies information about the type of signal source 105. The type of signal source 105 can be ascertained for example from the type of the received signal, a modulation, an identifier, a protocol used, a signal characteristic, a pulse frequency, a pulse phase modulation, a frequency modulation, a signal strength, a pulse coding, a pulse repetition frequency and/or a specific frequency band.

In another switch position of the switch 107, both internal information of the bearing device 101 and external information can be passed on to the type identifying device 102.

Both the internal and the external information can be processed by the type identifying device 102 in order to analyze a type of the signal source 105 and further indications concerning the residence probability, in order to arrive at a probability statement about the whereabouts of the signal source 105.

For the purpose of receiving the type identification of the signal source 105, the type identifying device 102 is connected to a database 106, in which various type assignments, such as the type of the received signal, the modulation used, the identifier, the protocol used and/or the specific frequency band, for example, to emitter types are stored. Information regarding altitudes at which the emitters 105 of a specific type are used can likewise be stored. Moreover, systems associated with a specific emitter type and the properties of the systems can be stored. The type identifying device 102 can comprise a neural network allowing learning from information that has already been processed. In this regard, it is possible to consult and refine previous findings during the determination of the emitter types and the systems associated therewith.

The a-priori residence probability determining device 103 can ascertain a location-dependent residence probability of the signal source depending on the received type identification of the signal source 105. The a-priori residence probability determining device 103 can also comprise a neural network allowing learning from information that has already been processed. In this regard, it is possible to consult and refine previous findings during the determination of the residence probability.

The evaluation device 104 is configured for superposing the location-dependent bearing measurement of the signal source, provided via the connection 108, with the location-dependent residence probability supplied by the a-priori residence probability determining device 103. In addition, the evaluation device 104 comprises the output 109, via which a position of the signal source 105 ascertained from the superposing is provided.

Figure 2:
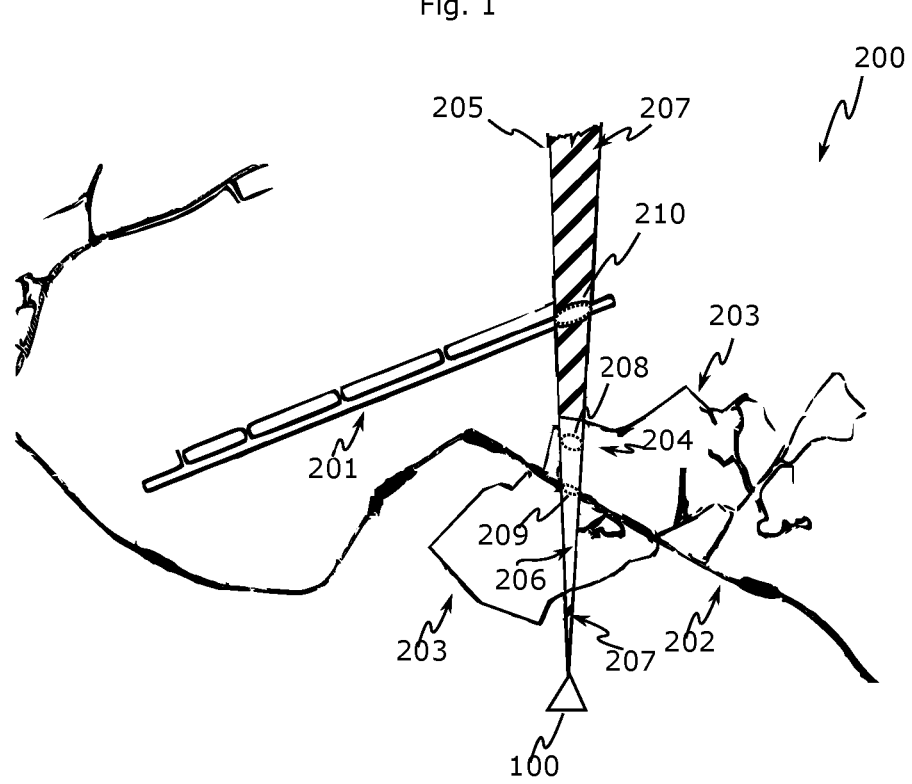
FIG. 2 shows a pictorial location-dependent residence probability distribution in accordance with one example embodiment.

FIG. 2 shows a pictorial representation of a location-dependent residence probability distribution in accordance with one example embodiment.

FIG. 2 shows a map 200 with geodata. There is an airfield 201, a road 202, a wetland area 203 and a fortified zone 204 in the wetland area 203.

At the localization apparatus 100 or the RC 100, a rough direction bearing acquisition or bearing measurement is performed which gives rise to the presumption of an emitter (not illustrated in FIG. 2) within the receiving cone 205 or bearing cone 205.

In one example, the signal source 105 is a ground-based emitter, such that a ground-based emitter localization (Ground Emitter Localization) is carried out by the localization apparatus 100.

On the basis of the signal information in the received signal and/or on the basis of the mission information, a type identification was able to be performed which gives rise to the presumption of a heavy transport vehicle as the origin of the signal. In particular, the mission objective may constitute finding a heavy transport vehicle.

Consequently, the map is divided into regions and the location-dependent residence probabilities are ascertained. Only regions on the airfield 201, the road 202 and the fortified zone 204 in the wetland area 203 are eligible for consideration for heavy transport vehicles. A weight and/or a ground loading capacity can be stored as metainformation in the map 200.

These items of information and/or metainformation can be used as a-priori information. Further possible items of a-priori information are an elevation and/or contour lines of the area, road maps and/or points of interest.

The probability of finding a heavy transport vehicle or system in the wetland area cone section 206 of the receiving cone 205, which lies within the wetland area 203 but outside the fortified zone 204 and/or the road 202, acquires a significantly lower probability value than the probability of finding the heavy transport vehicle or system in the cone sections 207 outside the wetland area 203. The dry land cone sections 207 of the receiving cone 205, which lie outside the wetland area 203, are rated overall with a higher probability than regions within the wetland area cone section 206, but the probability is in turn lower than the probability on the airfield 201, the road 202 and the fortified zone 204 in the wetland area 203.

Additional information can also be used in order to attain a further differentiation of the probability information of the emitter. By way of example, the a-priori residence probability determining device 103 could contain traffic data indicating that the road 202 is blocked. The use of the additional information may result in an increase in the probability of the whereabouts being situated on the airfield 201 and/or on the fortified zone 204 in the wetland area 203. The probabilities ascertained can be represented in a color-coded manner in a pictorial location-dependent residence probability representation 200 and/or as a pictorial location-dependent residence probability distribution 200. In this case, by data mining, all information that is available can be combined and/or superposed and a total residence probability can be ascertained.

The highest probability values thus result from the superposition of the probabilities within the bearing cone 205, which comprises the dry land cone section 207 and the wetland area cone section 206, and the airfield 201, the road 202 and the fortified zone 204 in the wetland area 203.

In the example in FIG. 2, the superposed fortified zone probability 208 shall be assumed to be higher than the superposed road probability 209. The superposed road probability 209 shall in turn be assumed to be higher than the superposed airfield probability 210.

In one example, real-time data ascertained during the localization can also be used besides the a-priori data. Terrain information qualifies as a-priori data. In this regard, vehicles are most probably moving on tarmac roads and not across lakes and/or unpaved fields. Furthermore, tactical information can influence the a-priori data, and also reconnaissance data, such as known SAM bases, satellite images, HAPs (High-Altitude Pseudo-Satellite), RCs etc. Flight charts can also be used. The probabilities may be conditional probabilities.

The signal sources 105, for example RF emitters 105, can be found very rapidly by using the a-priori information. The finding time can be in the range of a few seconds. Very high recognition rates can be achieved. The gain in speed may arise since as a result of the use of the a-priori data, during the evaluation of bearing signals, fewer unknown parameters have to be determined and the reconnaissance time and/or mission time can thus be shortened, in particular also since processing time can be saved.

The computation operations only have to concentrate on the regions in which a high appearance probability is ascertained.

There is also the possibility of searching for emitters in a targeted manner in regions with high probabilities, even if no signal has been captured yet. For example, optical sensors could be used for this purpose.

A filter could then be used to search where there are high a-priori probabilities. Moreover, for example, regions with a high probability could be searched using other sensors, for example active sensors such as optical sensors, in order for example to check landmarks such as an airfield or mission regions before the emitter is switched on and an active signal is generated. The bearing device can comprise active and/or passive sensors for this purpose. Using an active sensor, such as an optical sensor, firstly an area with a high appearance probability could be searched in order to create a priority list regarding the locations to which the sensors are intended to be moved first in order to carry out an analysis using the passive sensors, such as a bearing sensor.

The method for localizing a signal source 105 can be applicable to 2D scenarios and/or 3D scenarios.

For superposing the location-dependent bearing measurement of the signal source with the location-dependent residence probability, it is possible to use a grid-based filter or particle filter that combines all the probabilities ascertained. Data mining can also be carried out in the filter.

Superposing and/or combining probabilities can be regarded mathematically as multiplying probabilities.

From the emitter library 106 that stores the type of emitter with associated data, for example from the emitter database 106, a threat range can be derived a priori.

One example of an emitter is a tracking radar for a short range missile system. Such a radar system may be able to derive the threat range a priori from the emitter database 106. A system associated with the emitter 105 can act within such a threat range. It may furthermore be known that such a radar system is switched on only if a platform, for example an RC 100 and/or a localization apparatus 100 is situated within the threat range $r_{threat}$ of the tracking radar.

Consequently, the emitter 105 is switched on substantially only if an object is situated in the substantially circular threat range $r_{threat}$ around the emitter 105. It may be possible to derive therefrom indirectly an estimation of the distance of the object 100 and/or of a sensor with respect to the emitter 105, at least a maximum distance.

If an activity of such an emitter 105 is recognized because the localization apparatus 100 has penetrated into the threat range $r_{threat}$, the threat residence probability $l_{threat}(\hat{p})$ of the estimated position value $\hat{p}=[x,y]$ for the sensor 100 in the threat range arises as a probability function which has a highly weighted probability for positions $\hat{p}=[x,y]$ within the threat range $r_{threat}$ and otherwise has a probability with low weighting. Consequently, if a specific emitter type which employs a threat range is recognized, and if the emitter 105 is recognized as activated, a high probability of the object 100, the sensor 100 and/or an associated RC 100 being situated in the threat range $r_{threat}$ of the emitter 105 can be assumed.

A sensor 100 can be fitted on an RC and can be regarded as the object 100 that penetrates into the threat range $r_{threat}$. An estimated value of the distance $r_{\hat{p}}$ of the current estimated position value $\hat{p}=[x,y]$ of the sensor 100 for a specific geocoordinate value x, y of the sensor 100 as far as the emitter 105 can be regarded as less than or equal to the threat range $r_{threat}$ if a switched-on emitter 105 is recognized, and thus makes a high contribution to a residence probability determination both of the sensor 100 in relation to the emitter 105 and of the emitter 105.

In contrast thereto, in the case where an emitter 105 is switched off and signal recognition is absent, an almost unknown distance with respect to the emitter 105 must be assumed, which can be expressed by low weighting factors.

In other words, that means that only estimated distance values $r_{\hat{p}}$ which are in a range which is smaller than the threat range $r_{threat}$ of the emitter 105 which is intended to be located are valid. All other estimated values are weighted down by a low weighting factor in such a way that they are substantially eliminated.

A plausibility consideration can thus be established by the a-priori information. This is because the knowledge that the signal can only occur if the sensor 100 is situated in the threat range $r_{threat}$ makes it possible to rule out the presence of an erroneous estimation if an emitter 105 at a distance greater than the threat range is recognized as a tracking radar.

Instead of assuming a threat range $r_{threat}$ around the emitter 105, it is also possible to assume a corresponding threat range $r_{threat}$ around the sensor 100. Consequently, if the sensor 100 recognizes the switching on of the emitter, the sensor can assume that the emitter 105 is situated in a range less than or equal to the threat range $r_{threat}$ around the sensor 100. Only the bearing direction is not yet known.

The threat residence probability $l_{threat}(\hat{p})$ of the sensor 100 has a nonlinear character on account of the two validity ranges, i.e. within the threat range $r_{threat}$ and outside the threat range $r_{threat}$. It describes in particular a circle around the sensor 100 and/or around the RC 100 which supplied the corresponding threat residence probability value $l_{threat}(\hat{p})$. On account of the nonlinear character, such a measuring method can be implemented well by a filter, for example a particle filter (PF). When the filter is realized, the weighting factor of an individual particle is multiplied by the threat residence probability $l_{threat}(\hat{p})$ and assumptions for a residence probability within the threat range $r_{threat}$ when the emitter 105 is switched on are given a stronger weighting in comparison with outside the range.

Figure 3:
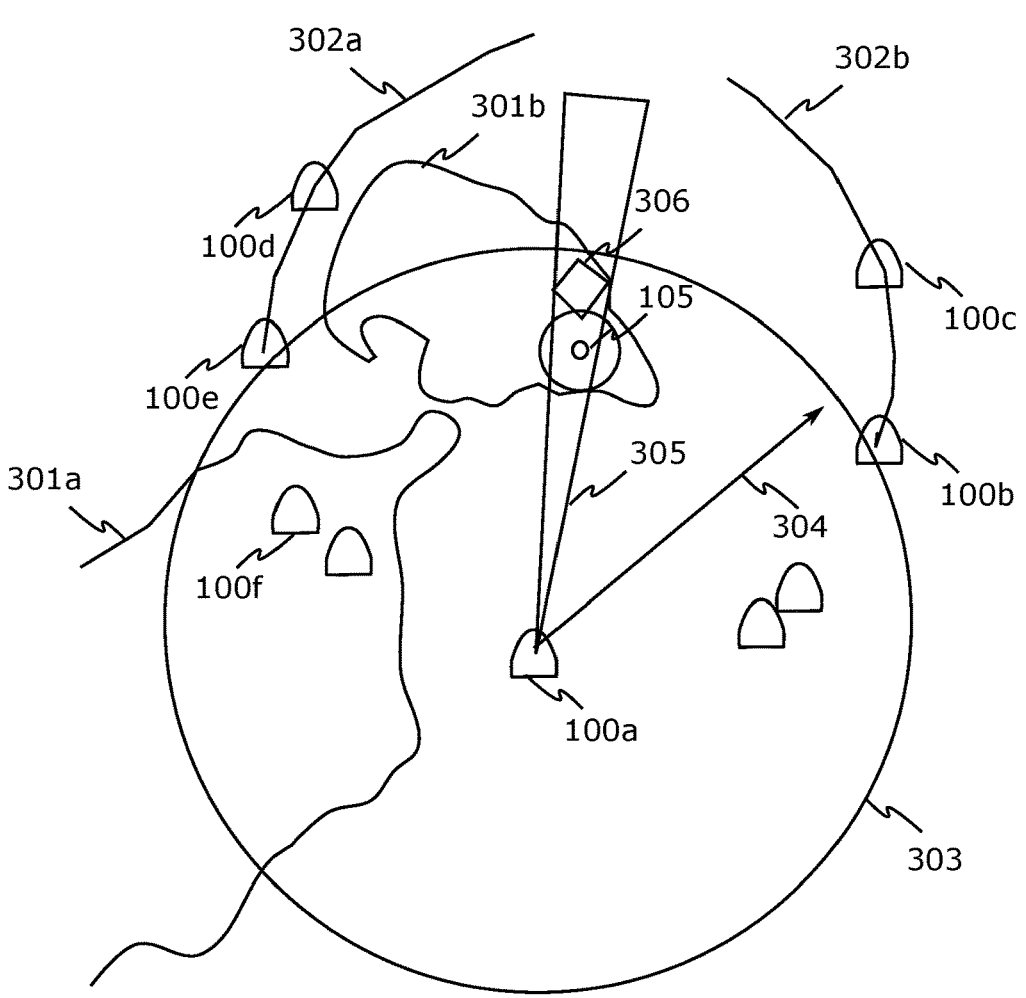
FIG. 3 shows a probability distribution function around a localization apparatus in accordance with one example embodiment.

FIG. 3 shows the probability distribution function around a localization apparatus 100a or around an RC 100a in accordance with one example embodiment.

FIG. 3 shows a multiplicity of RCs with associated sensors 100a, 100b, 100c, 100d, 100e, 100f which are moving along predefinable paths 302a, 302b over an area of water with dry land regions 301a, 301b. The circular probability distribution is given in the circle 303 having the radius $r_{threat}$ 304 proceeding from the sensor 100a. The rhombus 306 or the square 306 shows a system 306 situated in the vicinity of the signal source 105, for example an SAM 306, from which for example missiles and/or projectiles can proceed and which may be associated with the signal source 105.

The sensor 100a has a signal source 105 or an emitter 105 within the bearing cone 305.

In addition to the bearing measurement 305 and/or the type identification of the signal source 105, in the case of shooting of one of the multiplicity of sensors 100a, 100b, 100c, 100d, 100e, 100f, information about the cause of shooting can also be used in order to determine the location-dependent residence probability of the signal source. By way of example, it is possible to ascertain whether an RC and/or an associated sensor 100a, 100b, 100c, 100d, 100e, 100f has been attacked by a missile or an AAA (Anti-Aircraft Artillery) weapon. In this case, the attack is recognized as an attack and also classified according to the type of attack. It can be assumed for example that the system that carried out the attack is localized in the vicinity of the emitter 105.

By way of example, an image generating apparatus, in particular a photographic and/or video camera, can be used in order to classify the attack. The system that carried out the attack can be ascertained for example from the emitter library and/or the database 106.

The position estimation $\hat{p}=[x,y]$ of the emitter 105 can thus be updated by the shooting residence probability function $l_{shoot}(\hat{p})$ being updated on the basis of the range (Weapon Engagement Zone, WEZ) or firing range, since the attacking system must be localized within the radius $r_{WEZ}$ determined by the range. This radius can be determined from the emitter database depending on the recognized system, for example, in a similar manner to the threat range $r_{threat}$.

The shooting probability function indicating the probability of the shooting arises as a circular and nonlinear function around the emitter 105. As long as the estimated value of the distance $r_{\hat{p}}$ between the emitter 105 and the sensor 100a, 100b, 100c, 100d, 100e, 100f is assumed to be smaller than the radius $r_{WEZ}$ determined by the range, in particular the firing range, and/or the distance $r_{WEZ}$, a high probability arises if shooting has also actually been established.

If no shooting can be established, only a weak statement about the residence probability of a sensor 100 and/or of an emitter 105 may be able to be made, which is expressed by a low weighting factor. If no shooting has been established, it may be assumed that the sensor 100 is situated outside the radius $r_{WEZ}$ determined by the range.

In this case and in the case of all the other probability functions, unlike what is usual in the case of a probability function, the weighting factors do not have to be chosen to be less than the value 1. It is also not necessary for the addition and/or superposition to yield a sum of 1. The weighting factors of the probability functions and also the sum can also be greater than 1. The weighting factors indicate a relative measure which expresses the ratios of the different residence probabilities to one another.

On account of the different probabilities which are defined in turn for two regions and which substantially correspond to the inner region and the outer region of a circle having the radius $r_{WEZ}$ around the sensor 100a, 100b, 100c, 100d, 100e, 100f which supplies the corresponding measurement, type identification and/or image data, it is possible to employ exclusion criteria in order to arrive at a total residence probability. A filter, for example a particle filter (PF), can in turn be used for implementing the position estimation.

Proceeding from the sensor 100a, 100b, 100c, 100d, 100e, 100f hit and situated within the range $r_{WEZ}$ and the information thus obtained that the sensor was within the range $r_{WEZ}$, along the paths 302a, 302b on the basis of the threat range $r_{threat}$ it is possible to search for that path which is closest to the RC hit. If this path is then found and/or calculated, it can be updated on the basis of the shooting event with the shooting residence probability function $1_{shoot}$ ($\hat{p}$) As a result, the residence probability of the signal source 105 may increase in the region of the path found, as a result of which the information about the actual whereabouts of the signal source 105 can be narrowed down further and further. The location-dependent residence probability can thus be recursively determined more and more accurately.

Figure 4:
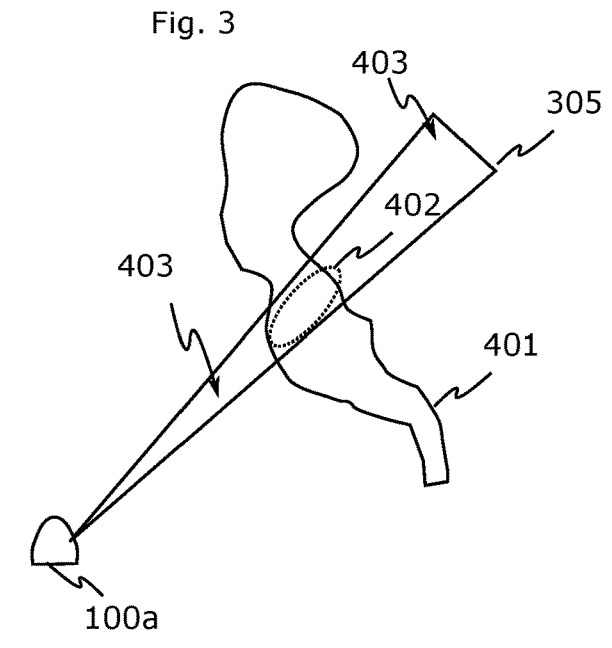
FIG. 4 shows a plan view of a mountain range and a localization apparatus in accordance with one example embodiment.

Geoinformation can be used as a further additional and/or alternative information source for the location-dependent residence probability, as is illustrated in FIG. 4.

FIG. 4 shows a plan view of a mountain range 401 and a localization apparatus 100a in accordance with one example embodiment.

By way of example, the information that systems associated with the signal source are used only at specific altitudes may be evaluated for the use of the geoinformation. In this regard, an SAM system may preferably be used at relatively high altitudes, such as on elevations and/or mountains, for example.

The altitude information can then be concomitantly included in the ascertainment of the location-dependent residence probability. In this regard, the position estimation and/or the location-dependent residence probability estimation $\hat{p}=[x,y]$ of an emitter 105 can then be calculated such that the altitude-based residence probability function $1_{alt}(\hat{p})$ or the altitude residence probability function $1_{alt}(\hat{p})$ is calculated on the basis of the altitude $h_{\hat{p}}$ of the location-dependent residence probability estimation $\hat{p}=[x,y]$.

The altitude residence probability function $1_{alt}(P)$ may determine an altitude $h_{\hat{p}}$ of the installation of an SAM system above the average elevation $E[h]$ of the terrain profile h of the area of use. A factor, for example the altitude weighting factor m, can be used to indicate the extent to which the altitudes above the average elevation are intended to be taken into consideration vis-à-vis other altitudes. An additive offset altitude factor that can indicate the granularity of the terrain profile h can be taken into consideration by a granularity factor k. The factor k may be added to the average elevation $E[h]$ and only altitudes of a terrain profile h which lie above the sum $E[h]+k$ may be weighted with the factor m. As a result of the weighting with the altitude weighting factor m, these altitudes of a terrain profile that are situated above $E[h]+k$ are consulted as relevant for the determination of a residence probability.

Only elevations starting from the factor designated by k above the average elevation $E[h]$ are thus accorded a significance for the location-dependent residence probability. By way of the ratio of the factor m in relation to a base value, for example 1, it is possible to indicate the ratio with which a landscape mark situated above the altitude $E[h]+k$ or a corresponding plateau is taken into consideration vis-à-vis values below that and thus the extent to which the altitude influences the calculation of the location-dependent residence probability, in particular during a superposition of a plurality of residence probability functions.

The weighting factors used for ascertaining the residence probabilities $1_{threat}(\hat{p})$, $1_{shoot}(\hat{p})$, $1_{alt}(\hat{p})$ can depend on the type identification of the signal source 105 or the recognized emitter type. In this regard, the altitude weighting factor m can be of great importance and thus have a high value particularly when seeking SAM systems and their associated emitters 105.

The superposed altitude-dependent and/or location-dependent residence probability 402 or the altitude residence probability function $1_{alt}(\hat{p})$, 402 can be restricted to an elliptic region 402 above the mountain range 401 by information from the bearing measurement 305 being superposed with the altitude residence probability function $1_{alt}(\hat{p})$ and the altitude information concomitantly influencing the calculation. In this case, the bearing measurement 305 indicates a region which yields a residence probability on the basis of the received signals. This region can be compressed to the elliptic region 402, in which the altitude of the mountain range 401 exceeds a minimum altitude. This minimum altitude may be able to be derived from the recognized emitter type and in particular from the database 106. In this region 402, it holds true that $h_{\hat{p}}{\geq}E[h]+k$. The regions of low altitude 403 have a low residence probability.

The weighting factors can for example be read out from an emitter database 106, be transferred from configuration files or be input via a GUI (Graphical User Interface). For this purpose, external sources can be accessed by switch 107. The selection can be effected depending on the mission, the environment, the terrain profile and/or the terrain.

As a technical implementation for the weighting and/or the superposition of the residence probabilities, here as well the grid point or particle weight, i.e. a weighting factor for a grid point or for a particle, can be multiplied by the altitude at the position of each particle. As a result, the grid point or particle weight would increase proportionally with the altitude and/or the value of the elevation.

A smoother and more flexible probability function could be achieved with this approach. A smooth probability function may arise upon a combination of a plurality of probability functions.

The altitude residence probability function $1_{alt}(\hat{p})$ describes the probability of a specific emitter type appearing at a predefinable altitude. In addition to the altitude residence probability, other a-priori probabilities may also appear, such as e.g. the ground surface (e.g. tarmac), the proximity to roads or military points of interest. If these items of information are fused by a particle filter, this results in a probability function having a smooth profile and containing substantially all fused items of information. To put it another way, $1_{alt}(\hat{p})$ may thus be a part of the smooth probability function, but may form the smooth probability function substantially only in combination with other probability functions.

Just like in the altitude-dependent residence probability function $1_{alt}(\hat{p})$, a smooth probability function is a nonlinear function. In particular, the smooth probability function may be a multimodal function having peaks in the region of high-altitude points. This type of function may be used if the function is calculated by a particle filter.

A simulation in which the signal source 105 or the emitter 105 is positioned on an island having an elevation higher than the surrounding water shows that when the geoinformation of the land elevation is used, the emitter 105 can be ascertained more rapidly than in a case in which the geoinformation is not used. In other words, superposing a location-dependent bearing measurement of the signal source 105 with location-dependent residence probabilities $1_{threat}(\hat{p})$, $1_{shoot}(\hat{p})$, $1_{alt}(\hat{p})$ derived from the type recognition can result in a recognition time of a few seconds. It is thus possible to satisfy a stipulation that a position of a signal source 105 is provided with a very short period duration. In particular that the position of an emitter 105 is recognized by the sensor 100 before the position of the sensor 100 is recognized by the emitter 105. In particular, by virtue of the use of geoinformation of the signal source 105, the achieved recognition accuracy within a predefined recognition time period can be increased in comparison with a case in which the information is not used.

When a multiplicity of signal sources 105 are found, the use of type-based residence probabilities can result in a simplification of the finding of the signal source 105 or the emitter 105. By way of example, if the situation involves finding three signal sources 105, with two being positioned on land and one on the water, evaluating type-based residence probabilities can contribute to avoiding erroneous localizations, so-called ghost tracks.

If the additional information that an SAM system is being sought is also present in this case, the emitter on the water can be excluded since it is known that an SAM system is not operated at sea level, but rather only above a predefinable minimum altitude.

An interplay of superposing residence probabilities and applying exclusion criteria can be effected for the purpose of finding the position. In this case, the superposing can be represented by high weighting factors and an exclusion criterion can be represented by low weighting factors.

When consideration is given to location-dependent residence probabilities, in particular information about road networks can be included, primarily if the situation involves searching for transportable signal sources 105. If such a signal source is found in terrain that is difficult to access, such as a hilly landscape or other unpaved terrain, this finding can be excluded as a ghost track with a high probability.

Other points of interest or focal points can also be included in the determination of the location-dependent residence probabilities, such as airports, command-and-control (C2) stations and/or factories, for example. An air defense system may be able to be found closer to structures worthy of defense, for example, while SAM systems will be more likely to be found at country borders.

This knowledge about the arrangement of emitters 105 at specific geocoordinates can thus be implemented by the selection of a specific residence probability function $l_{threat}(\hat{p})$, $l_{shoot}(\hat{p})$, $l_{alt}(\hat{p})$ and/or the setting of specific weighting factors. In a learning process, with each pass of the method the weighting factors can be correspondingly refined and adapted for the respective mission. Corresponding assignments can be stored in the database 106.

The morphology of the terrain or the type of terrain can also be included in the location-dependent residence probability. For example, whether the terrain in the vicinity of the signal source 105 is a wood/forest, land, water or a field. The constitution of the terrain can also have an influence on the propagation of a signal emitted by the signal source, which can again allow conclusions to be drawn about the location of the signal source 105. The current weather situation can likewise be consulted.

Such information can be introduced externally at least in part via a corresponding selection by switch 107. In this regard, the information can be stored on the individual localization apparatuses or RCs 100a, 100b, 100c, 100d, 100e, 100f and need not be calculated separately. It can also be transmitted to the respective apparatuses by data transmission means and be calculated or provided by a control center. For this purpose, individual RCs 100a, 100b, 100c, 100d, 100e, 100f may be in contact with one another via radio or laser connections, for example.

The location dependence of the bearing and/or of the residence probability can ensure that the information used refers to a uniform reference system. The location dependence can be specified by specifying geocoordinates or longitude and/or latitude specifications in the various measurement systems, for example Gauβ-Krüger or UTM (Universal Transverse Mercator).

The location-dependent residence probabilities $l_{threat}(\hat{p})$, $l_{shoot}(\hat{p})$, $l_{alt}(\hat{p})$ can be provided by various detection devices, for example by satellites, Joint Surveillance and Target Attack Radar System (JSTARS) aircraft, by aircraft equipped with a Ground Target Moving Indication (GMTI) radar, by local deployed forces, from traffic flow observations, from reports from tactical pilots, from maps used for flying at low altitudes, from nautical charts and/or from road maps.

The various information sources can be weighted differently depending on the recognized type of signal source. In the case of an SAM system, for example, the altitude may be of high importance, while for a transportable system the information about the road network and/or the road surface is accorded high importance.

The location-dependent residence probabilities can be divided into at least three groups. They can be divided into a threat range-dependent probability $l_{threat}(\hat{p})$, into a probability that takes account of the range $l_{shoot}(\hat{p})$ in the case of actual shooting, and into an altitude-based probability $l_{alt}(\hat{p})$. In the case of all these probabilities, the type of signal source 105 may be evaluated in order to set the correct group of the residence probability function and/or the combination thereof and/or the weightings thereof.

In this case, in particular, the evaluation of the elevation of the terrain and thus the altitude-based probability $l_{alt}(\hat{p})$ can contribute to rapidly finding the signal source 105 and avoiding ghost tracks and incorrect recognitions.

Determining the location-dependent bearing measurement of the signal source 105 and ascertaining the location-dependent residence probability may be carried out in a loop, wherein repeatedly new findings are supplied either externally or by way of the type identification by the selection device 107 and are compressed to form always new probabilities. In other words, in a repetition loop and/or feedback loop the particle filter (PF) may be supplied with always changed probabilities corresponding to the current level of knowledge.

Figure 5:
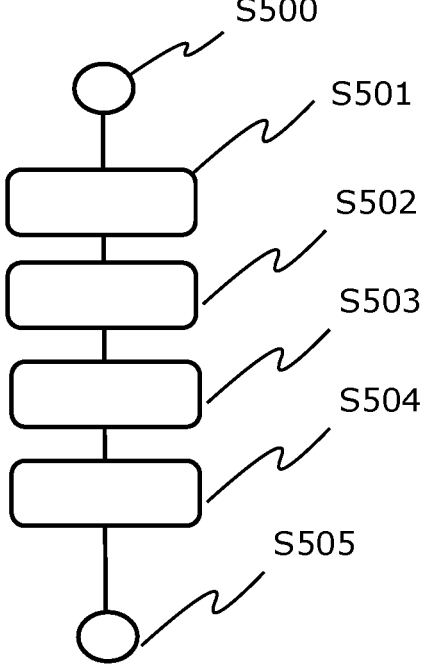
FIG. 5 shows a flow diagram for a method for localizing a signal source in accordance with one example embodiment.

FIG. 5 shows a flow diagram for a method for localizing a signal source in accordance with one example embodiment.

The signal source 105 emits a signal, for example an electromagnetic wave.

The method begins in the state S500. In the state S501, a location-dependent bearing measurement of the signal source 105 is carried out.

In the state S502, receiving a type identification of the signal source is effected, wherein the type identification can also be derived from the received signal source 105. In the state S503, a location-dependent residence probability of the signal source 105 is ascertained depending on the received type identification of the signal source 105 and the location-dependent bearing measurement of the signal source 105 is superposed with the location-dependent residence probability.

In the state S504, the position of the signal source 105 ascertained from the superposing is provided.

In the state S505, the method ends, wherein one embodiment can also provide for repeatedly carrying out the method, with at least partly new information.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100, 100*a*, 100*b*,
100*c*, 100*d*, 100*e*, 100*f*** Localization apparatus
101 Bearing device
101*a* Antenna
102 Type identifying device
103 A-priori residence probability determining device
104 Evaluation device
105 Signal source
106 Database
107 Switch
108 Connection for transmitting the results of the bearing measurement
109 Output
200 Map
201 Airfield
202 Road
203 Wetland area
204 Fortified zone
205 Receiving cone
206 Wetland area cone section
207 Dry land cone sections
208 Superposed fortified zone probability
209 Superposed road probability
210 Superposed airfield probability
301*a*, 301*b* Dry land regions
302*a*, 302*b* Paths
303 Circle
304 Radius r$_{threat}$
305 Bearing cone
306 System associated with the signal source
401 Mountain range
402 Regions of high altitude within the bearing cone
403 Regions of low altitude within the bearing cone
S500-S505 States of the method

The invention claimed is:

1. A method for localizing a signal source which emits a signal using a single localization apparatus, the method comprising:

determining a rough location-dependent bearing measurement of the signal source in a form of a bearing cone extending from the localization apparatus, wherein the signal source lies within the bearing cone;

determining a type identification of the signal source by evaluating a signal received from the signal source and by assigning the received signal to a specific emitter type based on signal information of the received signal, wherein the type identification is a type of the signal source;

ascertaining location-dependent residence probabilities of the signal source depending on the determined type identification of the signal source, wherein the location-dependent residence probabilities describe residence probabilities for the determined type of the signal source within a map, and wherein the location-dependent residence probabilities are independent from the localization apparatus;

superposing the location-dependent bearing cone of the signal source with the location-dependent residence probabilities; and providing a position of the signal source within the bearing cone ascertained from the superposing.

2. The method of claim 1, wherein ascertaining a location-dependent residence probability depending on the determined type identification of the signal source comprises at least one a-priori ascertaining method selected from the group of a-priori ascertaining methods consisting of:

reading out metainformation;
evaluating geoinformation;
providing a type-identified geographical map;
ascertaining points of interest;
evaluating image data;
evaluating movement data;
applying image processing methods;
applying data fusion; and
evaluating propagation conditions of the signal.

3. The method of claim 1, wherein determining the type identification of the signal source comprises evaluating an emitter database.

4. The method of claim 1, wherein the location-dependent bearing measurement comprises applying a bearing method selected from the group of bearing methods consisting of:

a time of arrival method;
an angle of arrival method; and
a received signal strength method.

5. The method of claim 1, wherein results of the location-dependent bearing measurement, results of the ascertainment of the location-dependent residence probability of the signal source and/or the ascertained position are/is transmitted and/or received.

6. The method of claim 1, wherein determining a location-dependent bearing measurement, determining the type identification of the signal source and ascertaining the location-dependent residence probability ($l_{threat}(\hat{p})$, $l_{shoot}(\hat{p})$, $l_{alt}(\hat{p})$) of the signal source take place during a movement.

7. The method of claim 1, wherein the method is carried out in a repetition loop using preceding results.

8. A non-transitory computer-readable storage medium having instructions stored thereon, which, when executed by a processor, configures the processor to:

determine a rough location-dependent bearing measurement of a signal source in a form of a bearing cone extending from a single localization apparatus, wherein the signal source emits a signal and lies within the bearing cone;

determine a type identification of the signal source by evaluating a signal received from the signal source and by assigning the received signal to a specific emitter type based on signal information of the received signal, wherein the type identification is a type of the signal source;

ascertain location-dependent residence probabilities of the signal source depending on the determined type identification of the signal source, wherein the location-dependent residence probabilities describe residence probabilities for the determined type of the signal source within a map, and wherein the location-dependent residence probabilities are independent from the localization apparatus;

superpose the location-dependent bearing measurement of the signal source with the location-dependent residence probabilities; and provide a position of the signal source within the bearing cone ascertained from the superposing.

9. A localization apparatus for localizing a signal source, comprising:

a bearing device comprising an antenna;

a type identifying device comprising a first processing circuit;

an a-priori residence probability determining device comprising a second processing circuit;

an evaluation device comprising a circuit;

wherein the bearing device is configured for determining a rough location-dependent bearing measurement of a signal source in a form of a bearing cone extending from the localization apparatus, wherein the signal source lies within the bearing cone;

wherein the type identifying device is configured for determining a type identification of the signal source by evaluating a signal received from the signal source and by assigning the received signal to a specific emitter type based on signal information of the received signal, wherein the type identification is a type of the signal source;

wherein the a-priori residence probability determining device is configured for ascertaining location-dependent residence probabilities of the signal source depending on the determined type identification of the signal source, wherein the location-dependent residence probabilities describe residence probabilities for the determined type of the signal source within a map, and wherein the location-dependent residence probabilities are independent from the localization apparatus;

wherein the evaluation device is configured for superposing the location-dependent bearing measurement of the signal source with the location-dependent residence probabilities; and for providing a position of the signal source within the bearing cone ascertained from the superposing.

10. A transport comprising a localization apparatus of claim 9.

* * * * *